Sept. 1, 1953  A. W. LA MARCHE  2,651,018
ELECTRICAL CONVERTER
Filed May 8, 1950

INVENTOR.
Austin W. LaMarche,
BY Brown, Jackson,
Boettcher & Dienner
Attys.

Patented Sept. 1, 1953

2,651,018

UNITED STATES PATENT OFFICE 2,651,018

ELECTRICAL CONVERTER

Austin W. La Marche, Prospect Heights, Ill.

Application May 8, 1950, Serial No. 160,759

8 Claims. (Cl. 321—18)

My invention relates to an electrical converter for converting alternating current into direct current.

The invention aims, generally, to provide a very simple, compact and inexpensive converter of the rectifier bridge type, characterised by an extremely accurate or close voltage regulation in the direct current load circuit leading from the converter.

My improved converter has been devised particularly for certain situations or uses where a close or accurate voltage regulation on the output side is very important. For example, one of these particular uses resides in the form of a charging unit for charging storage batteries. Another particular use resides in the form of a marine unit adapted to be coupled up to an alternating current supply line at a marine dock for supplying all direct current needs of a boat while the latter is moored at the dock, such as charging the boat's battery and energizing the lights, refrigerator and any and all other accessories of the boat, independently of such battery, while the boat is moored at the dock. Still another embodiment of my invention resides in an organ supply unit for supplying direct current to the controls of pipe organs and the like. These particular embodiments of my invention are referred to for the purpose of showing the ability of my improved electrical converter to meet very exacting requirements in voltage regulation or voltage control with regard to the load circuit, but it will be understood that the invention is not limited to these particular embodiments.

Referring now to the accompanying drawing illustrating such embodiments:

Figure 1:
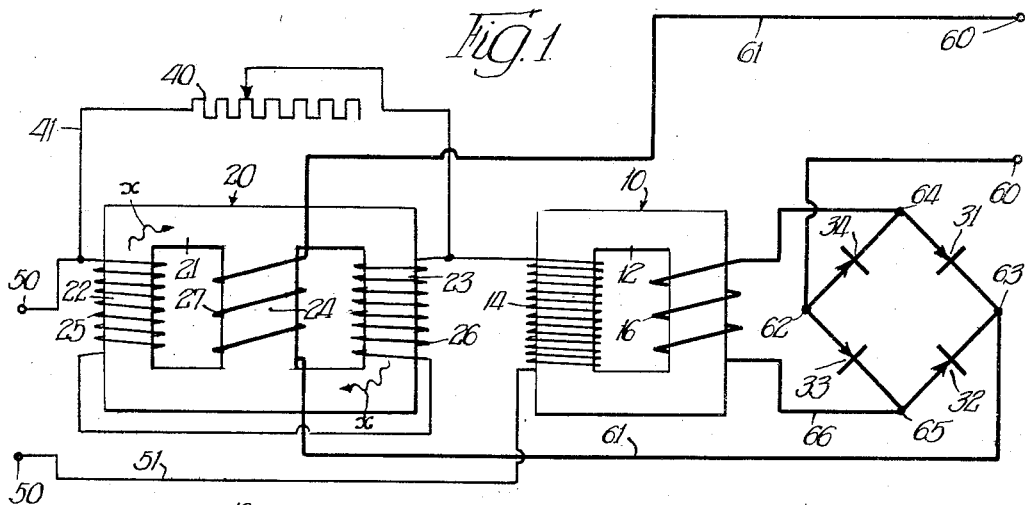
Figure 1 is a circuit diagram of one embodiment of my invention, particularly adapted for use as a battery charging unit or as the above described type of marine unit.

Referring first to Figure 1, the main elements of the converter are a transformer 10, a reactor 20, a rectifying bridge 30 and a controlling resistor 40.

The transformer 10 comprises a suitable core structure 12 carrying a primary winding 14 and a secondary winding 16. The reactor 20 has a closed three-legged core 21 comprising the two outside legs 22 and 23 and the central leg 24. In the preferred embodiment of the invention this reactor is of the saturable core type, but the invention is not necessarily limited thereto. Mounted on the two outside legs 22 and 23 of the reactor core are the two alternating current windings 25 and 26, and mounted on the central leg 24 of the core is the direct current control winding 27.

The rectifying bridge 30 comprises the four rectifier units 31, 32, 33 and 34 connected in the four arms of the bridge in the conjugate relation shown, for giving full wave rectification. These rectifier units are preferably of the copper oxide type, but it will be understood that they may be of other similar types capable of passing the required current loads.

The controlling resistor 40 is connected in a shunt circuit 41 extending across the two alternating current windings 25 and 26 of the reactor 20. In situations where the operating conditions are such that some adjustment is desirable or necessary in the voltage output curve of the converter, this regulating resistor 40 is preferably a variable resistor.

The alternating current input terminals of the device, indicated at 50, are adapted to be connected to any alternating current supply line, such as a conventional light or power circuit carrying 110 volt 60 cycle alternating current. The input circuit 51 leading from these terminals extends in series through the primary winding 14 of transformer 10, and through the two alternating current windings 25 and 26 of the reactor 20. The latter windings 25 and 26 are preferably wound and connected as shown, so that they produce opposite directions of alternating current flux in the two outside legs 22 and 23 of the core structure 21, as shown by the wavy arrows designated x.

The direct current output terminals of the device, indicated at 60, are connected to an output circuit 61 which extends from one terminal 60 to the corner 62 of the rectifying bridge 30, and from the other corner 63 of this bridge through the direct current control winding 27 of reactor 20, and thence to the other output terminal 60. The other two opposite terminals 64 and 65 of the rectifying bridge 30 are connected through alternating current output circuit 66 with the secondary winding 16 of transformer 10.

The direct current flow of the load circuit through the direct current control winding 27 of the reactor 20 performs an automatic regulating function in producing or maintaining a substantially constant voltage output curve. It would appear that as the load current goes up the alternating current voltage drop across the reactor is reduced, whereby a higher voltage is thereby impressed upon the primary winding 14 of transformer 10, so as to prevent a drop of direct current voltage with increased current flow in the direct current load circuit. The capacity or setting of the controlling resistor 40 connected in shunt across the alternating current windings 25 and 26 is an important factor in obtaining this close voltage regulation in the load circuit.

Figure 2:
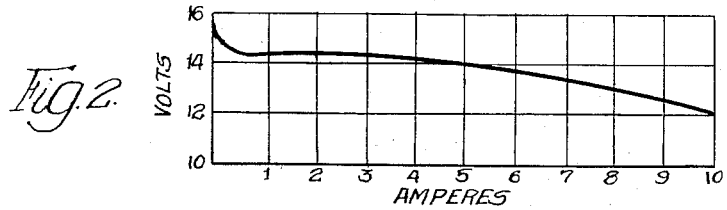
Figure 2 is a graph showing the substantially constant voltage output curve in such units.

This embodiment shown in Figure 1 has particular utility as a battery charging unit and also as a marine unit for dockside use, to which I have previously referred. It effects automatic circuit control of a battery and its load. In the marine unit embodiment for dockside use on boats, where various kinds of electrical equipment on the boat are supplied from the battery of the boat, the converter unit cuts in when needed and automatically cuts out when not needed. This is further illustrated by reference to the voltage curve of Figure 2.

For the sake of illustration, I shall refer to a 12 volt, 10 ampere size of electrical converter unit embodying the construction of Figure 1, which I have built and operated successfully. Referring to the voltage output curve of this unit, shown in Figure 2, as the battery voltage rises the cut-out point of this unit occurs substantially at the point indicated at approximately 14.5 volts. Thus, the battery voltage is automatically prevented from falling below approximately 12 volts; and the charging voltage is automatically prevented from rising above approximately 14.5 volts, except for a small charge preserving charge that is always on. This regulation or control occurs entirely within the magnetic and electrical characteristics of the unit, without any relays, switches or the like. From the experiments and tests that I have conducted and from the performance of the units that I have built, it is my understanding that the provision of the shunting resistor 40 across the windings 25 and 26 controls the voltage output curve, and particularly the low load end thereof, by delaying the saturating tendency of the reactor 20 until the output over the direct current load circuit approaches or reaches its maximum. When the direct current output is only a fraction of an ampere, or a few amperes, at the low load end of the curve, this shunting resistor 40 by-passes just enough of the primary current to delay the action of the reactor 20 until a higher load output occurs, with the result that the performance of the converter is greatly improved, particularly with regard to controlling or maintaining the desired voltage output curve.

Solely for the purpose of enabling one skilled in the art to obtain this type of performance with minimum or no empirical experimentation, I have listed below the turn ratios of the transformer and of the reactor, and the value of the controlling resistor 40 in the above-mentioned 12 volt, 10 ampere size units:

*Transformer 10*

Primary winding 14=200 turns of #18
Secondary winding 16=43 turns of #10

*Reactor 20*

Alternating current windings 25 and 26=144 turns of #16
Direct current control winding 27=55 turns of #10

*Resistor 40*

800 ohms, 25 watt (variable)

I wish it to be understood, however, that the invention is not limited to these proportions, etc.

Figure 3:
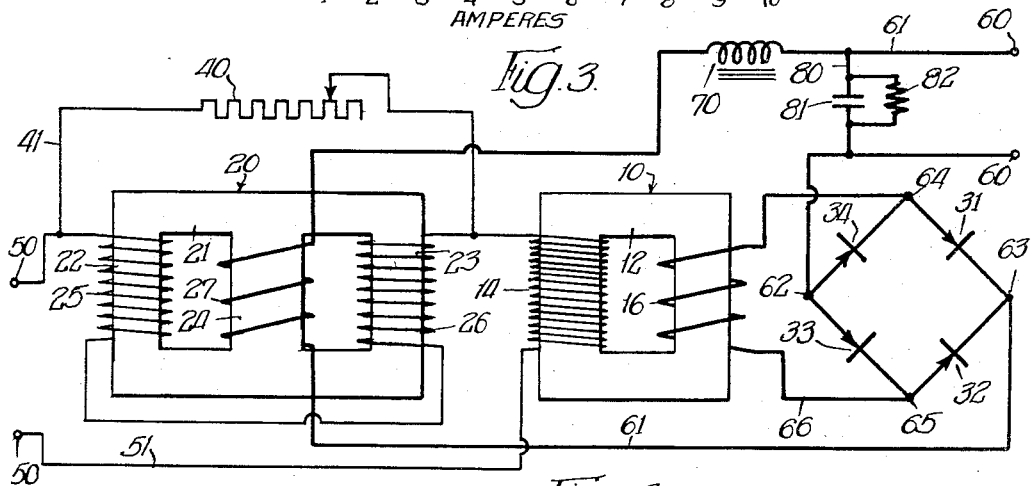
Figure 3 is a circuit diagram similar to Figure 1, showing another embodiment of my invention, particularly adapted for use as an organ supply unit.
Figure 4:
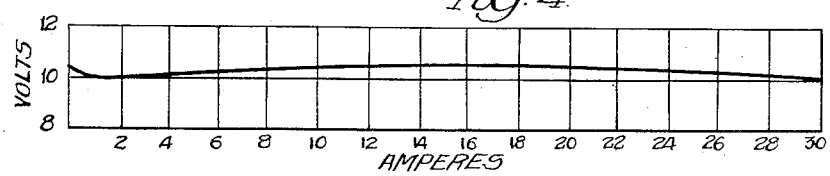
Figure 4 is a graph similar to Figure 2 illustrating approximately the voltage output curve of the latter type of unit.

The embodiment shown in Figure 3 supplements the main elements of Figure 1 by including a choke coil 70 in the direct current output circuit 61, and by also connecting a filter circuit 80 across this output circuit. The filter circuit 80 comprises a capacitor 81 and a shunting resistance 82. Such embodiment of my invention has particular utility as a current supply unit for pipe organs and the like where the direct current is utilized to energize gangs of magnets and relays of widely varying number. For the sake of illustration, I shall now refer to a 10 volt, 30 ampere size of converter unit embodying the construction shown in Figure 3, which I have constructed and operated successfully. In this unit I have been able to hold a voltage output curve substantially as shown in Figure 4, ranging from zero load to the full load of 30 amperes. At zero load the voltage in this typical embodiment is approximately 10.2 volts; at 2 amperes it is approximately 10 volts; at 14 amperes it is approximately 10.8 volts; and at 30 amperes it is approximately 10 volts. Thus, there is a variation of approximately 0.8 volt in the full load range of 30 amperes; or a variation of ±0.4 of a volt above or below the substantially median line of the curve.

Here again, for the purpose of enabling one skilled in the art to obtain this type of performance with minimum or no empirical experimentation, I have listed below the turn ratios of the transformer and the reactor, the value of the controlling resistor 40, choke coil 70, capacitor 81, etc. in the above mentioned 10 volt, 30 ampere units.

*Transformer 10*

Primary winding 14=88 turns of #12
Secondary winding 16=17 turns of #8

*Reactor 20*

Alternating current windings 25 and 26=73 turns of #12
Direct current control winding 27=24 turns of #8

*Resistor 40*

500 ohms, 25 watt (variable)

*Choke coil 70*

62 turns of #8

*Capacitor 81*

3000 mfd.

I wish it to be understood, however, that the invention is not limited to these proportions, etc.

In either of the preceding embodiments the secondary winding 16 of the transformer 10 may be provided with a series of taps for tapping off different voltages for the direct current load circuit.

I claim:

1. In an electrical converter of the class described, the combination of a transformer, primary and secondary windings on said transformer, a reactor comprising a three-legged core, alternating current windings on the outer legs of said core and a direct current winding on the center leg of said core, an alternating current input circuit extending in series through the primary winding of said transformer and the alternating current windings of said reactor, a full-wave rectifying bridge having two diametrically opposite terminals connected to the secondary winding of said transformer, a direct current output circuit connected to the other two diametrically opposite terminals of said bridge and connected through the direct current winding of said reactor, and a resistor connected in shunt across said alternating current windings of said reactor.

2. In an electrical converter of the class described, the combination of a transformer, primary and secondary windings on said transformer, a reactor comprising a three-legged core, alternating current windings on the outer legs of said core and a direct current winding on the center leg of said core, an alternating current input circuit extending in series through the primary winding of said transformer and the alternating current windings of said reactor, a full-wave rectifying bridge having two diametrically opposite terminals connected to the secondary winding of said transformer, a direct current output circuit connected to the other two diametrically opposite terminals of said bridge and connected through the direct current winding of said reactor, and a variable resistor connected in shunt across said alternating current windings of said reactor for controlling the voltage output curve of said converter.

3. In an electrical converter of the class described, the combination of a transformer, primary and secondary windings on said transformer, a reactor comprising a three-legged core, alternating current windings on the outer legs of said core and a direct current winding on the center leg of said core, said alternating current windings being wound and connected to produce opposite directions of alternating current flux in the two outer legs of said reactor core, an alternating current input circuit extending in series through the primary winding of said transformer and the alternating current windings of said reactor, a full-wave rectifying bridge having two diametrically opposite terminals connected to the secondary winding of said transformer, a direct current output circuit connected to the other two diametrically opposite terminals of said bridge and connected through the direct current winding of said reactor, and a resistor connected in shunt across said alternating current windings of said reactor.

4. In an electrical converter of the class described, the combination of a transformer, primary and secondary windings on said transformer, a reactor comprising a three-legged core, alternating current windings on the outer legs of said core and a direct current winding on the center leg of said core, an alternating current input circuit extending in series through the primary winding of said transformer and the alternating current windings of said reactor, a full-wave rectifying bridge having two diametrically opposite terminals connected to the secondary winding of said transformer, a direct current output circuit connected to the other two diametrically opposite terminals of said bridge and connected through the direct current winding of said reactor, a resistor connected in shunt across said alternating current windings of said reactor, and a choke coil connected in series in said direct current output circuit.

5. In an electrical converter of the class described, the combination of a transformer, primary and secondary windings on said transformer, a reactor comprising a three-legged core, alternating current windings on the outer legs of said core and a direct current winding on the center leg of said core, an alternating current input circuit extending in series through the primary winding of said transformer and the alternating current windings of said reactor, a full-wave rectifying bridge having two diametrically opposite terminals connected to the secondary winding of said transformer, a direct current output circuit connected to the other two diametrically opposite terminals of said bridge and connected through the direct current winding of said reactor, a variable resistor connected in shunt across the alternating current windings of said reactor for controlling the voltage output curve of said converter, a choke coil connected in series in said direct current output circuit, and a filter network connected across said output circuit.

6. In an electrical converter, the combination of a transformer, primary and secondary windings on said transformer, a reactor, alternating current and direct current windings on said reactor, an alternating current input circuit connecting with said transformer primary and reactor alternating current windings, a rectifying network connecting with the secondary winding on said transformer, a direct current output circuit connecting with said rectifying network and the direct current winding on said reactor, and a resistor connected in shunt across the alternating current windings on said reactor operative to produce a substantially constant voltage output curve for the converter as changes in the load current occur.

7. In an electrical converter, the combination of a transformer, primary and secondary windings on said transformer, a reactor, alternating current and direct current windings on said reactor, an alternating current input circuit connecting with said primary and alternating current windings, a rectifying network connecting with the secondary winding on said transformer, a direct current output circuit connecting with said rectifying network and the direct current winding on said reactor, and a control shunt connected across said alternating current windings on said reactor operative to produce a substantially constant voltage output curve for the converter, said control shunt comprising a variable resistance.

8. In an electrical converter, the combination of a transformer, primary and secondary windings on said transformer, a saturable core reactor, alternating current and direct current windings on said reactor, an alternating current input circuit connecting with said primary and alternating current windings, rectifying means connecting with the secondary winding on said transformer, a direct current output circuit connecting with said rectifying means and with the direct current winding on said reactor, and a non-resonating shunt circuit including a resistor connected across the alternating current winding on said reactor of such characteristic as to delay the core saturating tendency of said reactor until the load current in said output circuit approaches its maximum.

AUSTIN W. LA MARCHE.

References Cited in the file of this patent

UNITED STATES PATENTS

| Number | Name | Date |
|---|---|---|
| 1,839,869 | Davis | Jan. 5, 1932 |
| 2,012,588 | Logan | Aug. 27, 1935 |
| 2,164,912 | Giroz | July 4, 1939 |

FOREIGN PATENTS

| Number | Country | Date |
|---|---|---|
| 499,411 | Great Britain | Jan. 24, 1939 |